Aug. 30, 1949.    W. H. NEELY    2,480,667
WIRE SPRING FOR UPHOLSTERED SPRING STRUCTURES
Filed Feb. 21, 1944    2 Sheets-Sheet 2
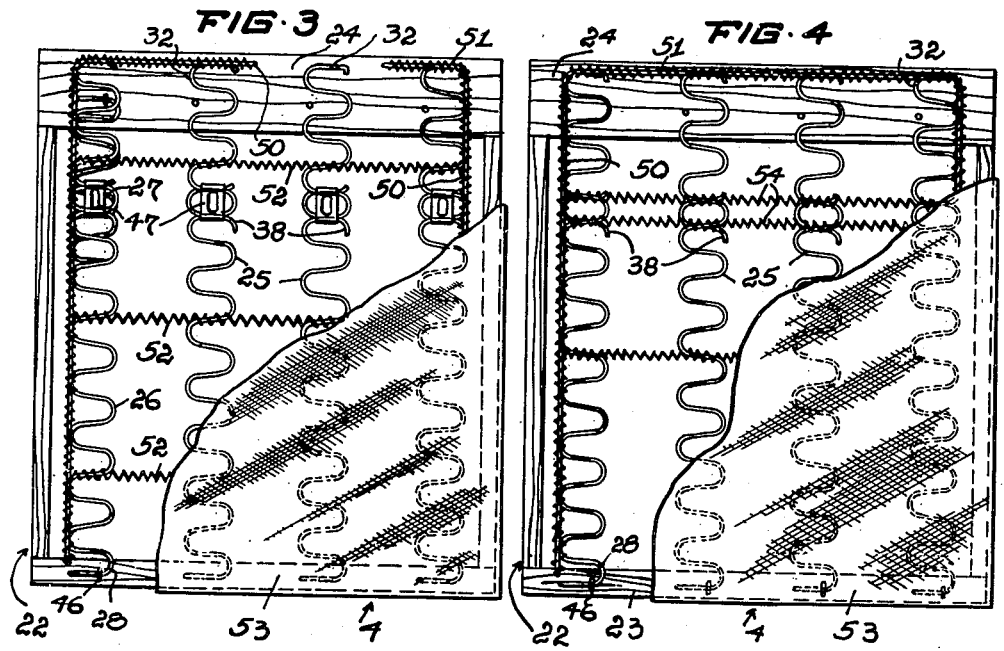
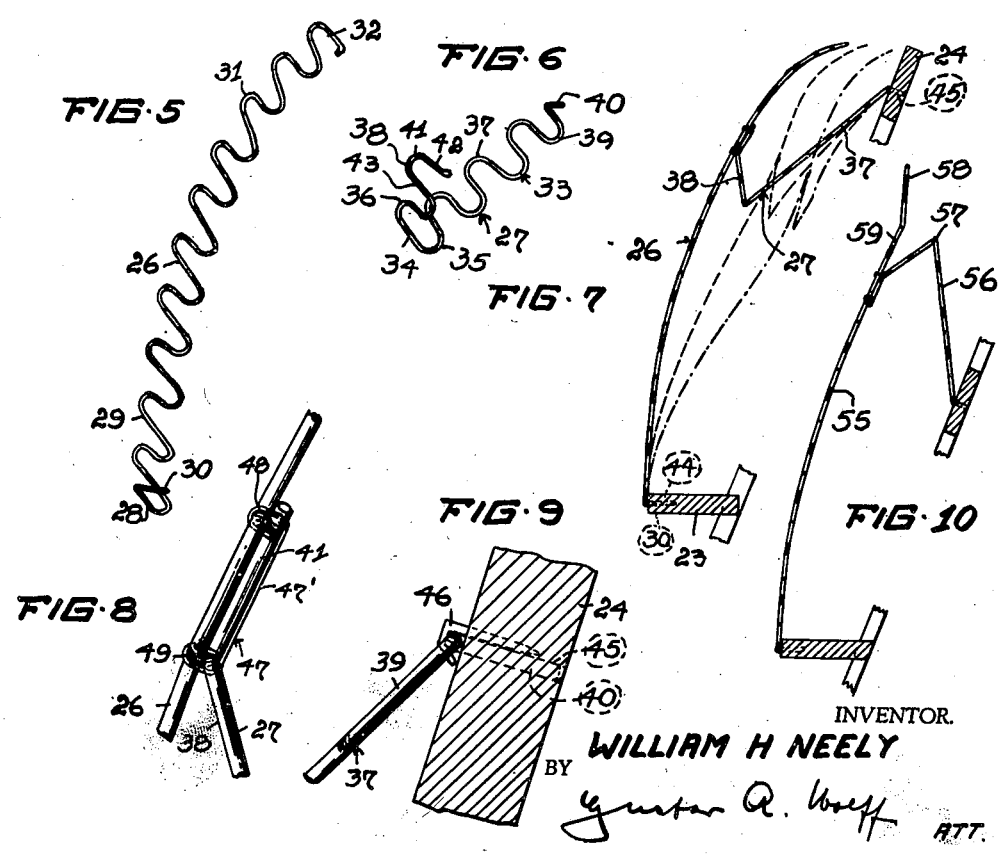
INVENTOR.
WILLIAM H NEELY
BY
ATT.

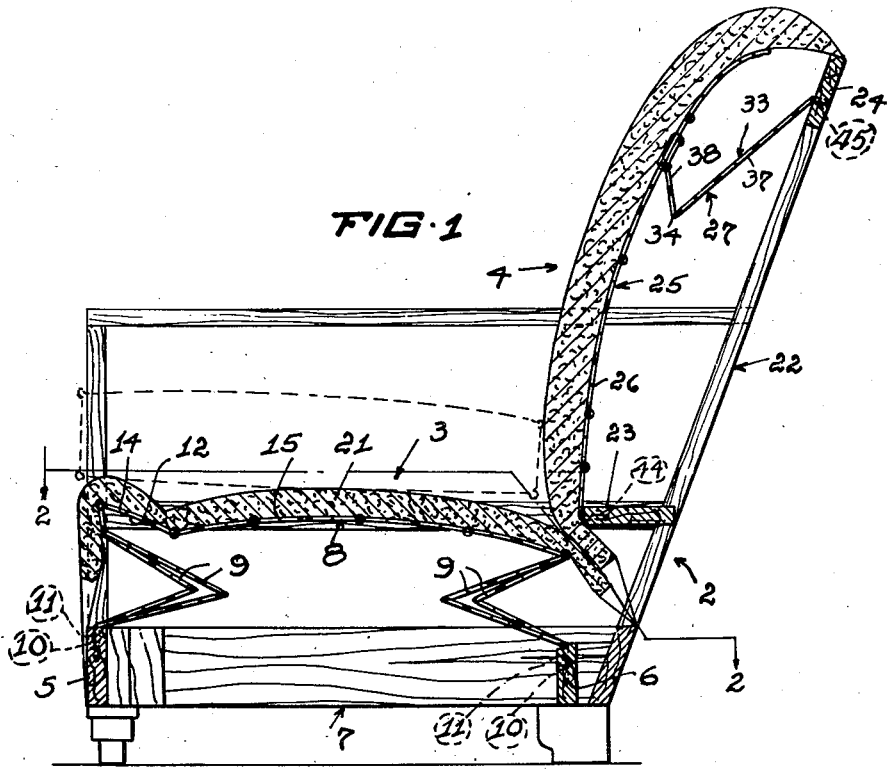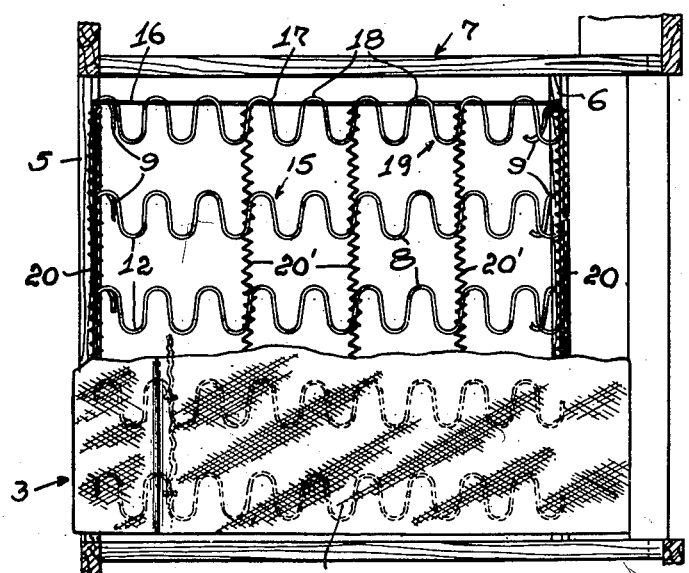

Patented Aug. 30, 1949

2,480,667

UNITED STATES PATENT OFFICE 2,480,667

WIRE SPRING FOR UPHOLSTERED SPRING STRUCTURES

William H. Neely, Cleveland, Ohio, assignor to The Universal Wire Spring Company, Cleveland, Ohio, a corporation of Ohio Application February 21, 1944, Serial No. 523,320

4 Claims. (Cl. 155—179)

This invention relates in general to upholstered seat structures with elongated wire springs secured side by side crosswise of a frame and, more particularly, to the elongated wire springs of such seat structures. These springs, when mounted on an open frame member crosswise thereof and padded and covered by covering means stretched over the springs, should be free of stiffness in localized areas and readily yield to the load applied when in use. However, these requirements are not fully satisfied in present-day spring constructions of this type which employ springs formed with offset end zones and cantilever means attached to the supporting areas of these springs so as to extend in front of the offset end zones and eliminate these zones from contact with a load. Thus, springs constructed as stated above are in their bent portions subjected to stresses opposed to the forces applied in shaping the springs, therefore, areas of the springs located near their bent portions cannot readily be controlled when loaded.

The primary object of the present invention is the provision of an improved elongated wire spring for wire spring structures, which spring is assembled from a load supporting spring member with attachment and supporting means at its one end, and an individual attachment and supporting member coupled with the rear face of said load supporting spring member in an area between its opposite ends, resulting in a spring including a load carrying portion supported at its opposite ends and a cantilever-like portion integrally extended from said load carrying portion.

Another object of the invention is the provision of an elongated wire spring for wire spring structures which is assembled from a load supporting spring member with attachment and supporting means at its one end, and an individual, substantially V-shaped attachment and supporting member having a short arm and a longer arm and coupled with the end portion of its short arm to the rear face of the load supporting spring member in an area between the opposite ends thereof.

A further object of the invention is the provision of an elongated, sinuously corrugated wire spring for wire spring structures which is assembled from a sinuously corrugated load supporting spring member with attachment and supporting means at its one end, and an individual, sinuously corrugated, angular V or U-shaped attachment and supporting member, having a long and a short lever arm and its short lever arm, which is preferably slightly offset, coupled with the rear face of the load supporting spring member in an area between the opposite ends thereof.

Still another object of the invention is the provision of an elongated, sinuously corrugated wire spring for wire spring structures which is assembled from a sinuously corrugated main spring member having attachment and supporting means at its one end, and an individual, sinuously corrugated supporting member of V or U-shape, having a long and a short lever arm, having the end of the short arm coupled with the rear face of the main spring member, and having the long arm extended toward one end of the main spring member in spaced relation with respect thereto.

In addition, the invention has other marked improvements and superiorities which radically distinguish it from presently known structures. These improvements or superior characteristics embodying certain novel features of construction are clearly set forth in the appended claims; and a preferred embodiment of the invention is hereinafter shown with reference to the accompanying drawings forming part of the specification.

In the drawings:

Fig. 1 is a transverse sectional view through an upholstered chair embodying a spring back structure assembled from elongated, corrugated wire springs built in accordance with the invention;

Fig. 2 is a sectional view through Fig. 1 showing the construction of the seat structure of the chair with portions of the padding and the springs broken away, the section being taken on line 2—2 of Fig. 1;

Fig. 3 is a front view of the back structure of the chair with portions of the padding and the springs broken away showing a spring structure built of springs having their load carrying portions and their supporting portions secured to each other by means of clips;

Fig. 4 is a view similar to Fig. 3, with the exception that the load carrying portions and the supporting portions of the springs are coupled with each other by elongated helical wire coils;

Fig. 5 is a perspective view of the load carrying portion of a spring;

Fig. 6 is a perspective view of the V-shaped supporting portion of a spring;

Fig. 7 is a diagrammatic view of an assembled spring showing in broken lines the shape of the spring when partly loaded and in dash-dotted line the shape of the spring when fully loaded;

Fig. 8 is an enlarged fragmentary side-view of the clip coupled portion of an assembled spring; and Fig. 9 is an enlarged side-view of the end portion of the V-shaped supporting member of a spring attached to the top rail of the back frame of a piece of furniture;

Fig. 10 is a diagrammatic view of an assembled spring of somewhat modified form.

Referring now more particularly to the drawings, reference numeral 2 represents an upholstered piece of furniture embodying a seat member 3 and a back rest 4. Seat member 3 mounts on the front and rear rails 5 and 6 of an open frame 7 a plurality of sinuously corrugated wire springs 8 arranged in parallel relation to each other. Each of these springs is formed at its opposite ends with V-shaped supporting arms 9 which include at their ends straight end portions 10 threaded into bores 11 in said rails and have their front portions 12 bent upwardly and outwardly to form inclined portions 14. Springs 8 when mounted on rails 5 and 6 form an elevated seating surface 15 which is encircled by an edge wire member 16, interlaced at 17 with the sides 18 of the outer springs 19 and by helical wire coils 20 secured to the front and rear ends of the seating portions of said springs. A plurality of helical wire coils 20 interconnecting springs 8 with each other provide proper support for a padding 21 which covers seating surface 15. This padding is hog-ringed to the springs between their opposite ends and attached to the rails of the frame as customary.

Back rest 4 embodies an open frame 22, the bottom rail 23 of which is forwardly extended with respect to top rail 24. This frame is bridged by a plurality of elongated, sinuously corrugated wire springs 25, see Figs. 3 and 4, secured to top and bottom rails 23 and 24. Springs 25 are assembled from two spring members, a load carrying spring member 26 (see Fig. 5) and a supporting spring member 27 (see Fig. 6). Load carrying spring member 26, a sinuously corrugated, slightly outwardly curved wire member, has integrally extended from the last loop 28 at its bottom portion 29 a straight extension 30 arranged angularly to the longitudinal axis of said wire member and has the last corrugation of its top portion 31 shaped to a partly closed loop 32. Supporting spring member 27, a sinuously corrugated wire member 33, is sharply twisted at its straight portion 34 connecting left- and right-handed loops 35 and 36, so that member 33 which is thus V-shaped includes a long lever arm 37 and a short lever arm 38 acute-angularly related to arm 37. Arm 37 has integrally extended from its end loop 39 a straight extension 40 angularly related to the longitudinal axis of said arm and short arm 38 has its end loop 41 angularly offset toward arm 37 to permit unimpeded shifting of arm 38 when members 26 and 27 are assembled to form the spring 25. In the assembled spring the straight portions 42 and 43 adjacent to loop 41 of short lever arm 38 are coupled with two straight portions of spring member 26, so that the supporting member 27 extends from the rear face of member 26 between the ends thereof. Springs 25 are secured to frame 22 by extending straight extensions 30 at the bottom of members 26 into bores 44 in bottom rail 23 and straight extensions 40 at the ends of lever arms 37 into bores 45 in top rail 24, and these extensions are held in place by hook-shaped nails 46 driven into the respective rails and engaging the respective members.

Coupling of each of the members 26 with a member 27 is effected by a substantially U-shaped clip 47 having its web portion 47' engaged with the rear face of loop 41 of member 26 and its flanges 48, 49 wrapped around the respective straight portions of members 26 and 27.

When mounted on frame 22 the springs 25 form a supporting surface partly encircled by a single or assembled edge wire member 50 of U-shaped form which is coupled with the end loops 32 of members 26 and the sides of the outer springs by a helical wire coil 51. A plurality of helical coils 52 couple springs 25 crosswise with each other and provide proper support for a padding and covering 53 stretched over the springs and attached to frame 22, as customary.

Coupling between members 26 and 27 of springs 25 can also be effected by helical wire coils 54, see Fig. 4, disclosing a construction in which the helical wire coils simultaneously connect members 26 with members 27 and couple the springs crosswise with each other, or the coupling between the members of each of the springs 25 may be coupled by individual short helical wire coils to avoid excessive stiffness at this particular area of the back rest.

Under load, a spring constructed as described above, will not be deformed in the area in which members 26 and 27 are coupled with each other, as the angular shape of supporting member 27 permits sufficient yield. Thus, supporting member 27 yields sufficiently to insure full flexibility of member 26, so that the latter properly contacts a load and readily yields to its shape. In addition, supporting member 27 smoothens the action of the spring in which under load the lower part of member 26 and lever 37 are compressed and lever 38 is tensioned, so that all stresses caused by such compression are properly counteracted, as will best be understood from the diagrammatic showing of Fig. 7, disclosing in broken lines the spring partly loaded and in dash-dotted lines fully loaded.

In some cases it might be desirable to attach the V-shaped support for the main spring member of the spring of the type described in upside-down position, see the diagrammatic showing of Fig. 10, in which main spring member 55 is supported between its opposite end by a V-shaped support 56, the apex 57 of which is upwardly extended. In this figure main spring member 55 has the upper portion 58 of cantilever-like extension 59 bent forwardly by twisting one of the straight portions of the looped configurations of the main spring member. Structures of this type, with V-shaped or similar supports in normal or upside-down position, are preferably used for back constructions with rolled top edges but may also be included in seat constructions. In the latter case portion 58 of cantilever-like extension 59 forms at the end of a seat construction an upwardly and outwardly extended edge adapted to eliminate the commonly used edge roll at the front edge of present-day upholstered seat constructions, which edge roll properly supports the removable seat cushions of these seat constructions.

Having thus described my invention, what I claim is:

1. A wire spring for cushioned seat structures comprising an elongated, sinuously corrugated body portion, and an independent V-shaped sinuously corrugated supporting portion for said body portion, said V-shaped supporting portion including a short arm and an arm of substantial length, the short arm including an angularly offset end portion engaged with the rear face of said body portion and rigidly coupled therewith between the opposite ends thereof, and the long arm being extended from said short arm rearwardly of said body portion in spaced relation with respect thereto, said angularly offset end portion of said short arm effecting rearward spacing of the apex of said V-shaped supporting means from said elongated, corrugated body portion.

2. A wire spring for cushioned seat structures comprising a sinuously corrugated body portion including left and right handed loops connected by straight portions, and independent, V-shaped, sinuously corrugated wire supporting means having a short arm and an arm of substantial length, the short arm contacting the rear face of said body portion and being rigidly coupled with at least two straight portions of said body portion between its opposite ends, and the other arm being rearwardly extended from said short arm toward one end of said body portion in spaced relation with respect thereto.

3. A wire spring for cushioned seat structures comprising a sinuously corrugated body portion including left and right handed loops connected by straight portions, and independent V-shaped wire supporting means having a short arm and an arm of substantial length, the short arm including a sinuously corrugated portion rigidly coupled with at least two straight portions of said body portion between its opposite ends, and the other arm being extended from said short arm rearwardly of said body portion toward one end thereof and in spaced relation with respect thereto.

4. In a cushioned seat structure a frame having oppositely arranged rails, a sinuously corrugated wire spring member of substantial length rigidly connected with one end to one of said rails so that its other end extends in spaced relation from the other one of said rails, and a shorter, sinuously corrugated wire spring member of V-shaped form having a long arm rigidly connected to the other one of said rails in alignment with said first spring member and spaced relation with respect thereto and having a short arm including an end portion contacting the rear face of said first spring member and rigidly coupled with said spring member between the opposite ends thereto, the said long arm having several times the length of said short arm.

WILLIAM H. NEELY.

REFERENCES CITED

The following references are of record in the file of this patent:

UNITED STATES PATENTS

| Number | Name | Date |
|---|---|---|
| 2,122,979 | Gleason | July 5, 1938 |
| 2,203,598 | Nelems | June 4, 1940 |
| 2,214,136 | Hopkes | Sept. 10, 1940 |
| 2,234,253 | Hopkes | Mar. 11, 1941 |
| 2,279,336 | Neely | Apr. 14, 1942 |
| 2,308,772 | Neely | Jan. 19, 1943 |
| 2,384,191 | Neely | Sept. 4, 1945 |

FOREIGN PATENTS

| Number | Country | Date |
|---|---|---|
| 13,849 | Great Britain | 1912 |
| 271,629 | Great Britain | June 2, 1937 |
| 472,607 | Great Britain | Mar. 25, 1937 |
| 621,947 | France | Feb. 14, 1927 |